United States Patent
Lee

(10) Patent No.: US 12,379,809 B2
(45) Date of Patent: Aug. 5, 2025

(54) SENSOR DEVICE AND METHOD OF DRIVING THE SAME

(71) Applicant: Samsung Display Co., Ltd., Yongin-Si (KR)

(72) Inventor: Ji Yeong Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/195,977

(22) Filed: May 11, 2023

(65) Prior Publication Data

US 2024/0143115 A1    May 2, 2024

(30) Foreign Application Priority Data

Oct. 31, 2022    (KR) .................. 10-2022-0142685

(51) Int. Cl.
  *G06F 3/044* (2006.01)
  *G06F 3/041* (2006.01)

(52) U.S. Cl.
  CPC ............ *G06F 3/044* (2013.01); *G06F 3/0412* (2013.01)

(58) Field of Classification Search
  None
  See application file for complete search history.

(56) References Cited

U.S. PATENT DOCUMENTS

| | | | |
|---|---|---|---|
| 9,563,294 B2 | 2/2017 | Lee | |
| 9,791,986 B2 * | 10/2017 | Ouh | G06F 3/0446 |
| 11,487,391 B2 * | 11/2022 | Mohamed | G06F 3/0416 |
| 11,995,265 B2 * | 5/2024 | Lee | G06F 3/0412 |
| 2011/0298479 A1 * | 12/2011 | Matsushima | G06F 3/0446 324/658 |
| 2012/0313890 A1 * | 12/2012 | Mohindra | G06F 3/0446 345/174 |
| 2013/0307791 A1 * | 11/2013 | Edwards | G06F 3/0446 345/173 |
| 2014/0347310 A1 * | 11/2014 | Hargreaves | G06F 3/0446 345/174 |
| 2014/0362036 A1 * | 12/2014 | Mo | G06F 3/04164 345/174 |
| 2015/0309612 A1 * | 10/2015 | Morein | G06F 3/04164 345/174 |

(Continued)

FOREIGN PATENT DOCUMENTS

| | | |
|---|---|---|
| KR | 10-1336515 B1 | 12/2013 |
| KR | 10-1898979 B1 | 9/2018 |

(Continued)

*Primary Examiner* — Patrick N Edouard
*Assistant Examiner* — Peijie Shen
(74) *Attorney, Agent, or Firm* — Innovation Counsel LLP

(57) ABSTRACT

A sensor device of the disclosure includes first sensors, second sensors forming a capacitance with the first sensors, and a sensor driver configured to transmit driving signals to the first sensors and receive sensing signals from the second sensors. The sensor driver simultaneously transmits driving signals to at least two first sensors during a first period and does not transmit driving signals to the rest of the first sensors during the first period, and the sensor driver transmits an offset signal to at least one of the second sensors during the first period and receives the sensing signals from at least two of the second sensors other than the at least one of the second sensors during the first period.

18 Claims, 15 Drawing Sheets

(56) References Cited

U.S. PATENT DOCUMENTS

| | | | |
|---|---|---|---|
| 2016/0070387 A1* | 3/2016 | Park | G06F 3/0446 |
| | | | 345/174 |
| 2016/0202835 A1* | 7/2016 | Mizuhashi | G02F 1/13306 |
| | | | 345/174 |
| 2016/0209966 A1 | 7/2016 | Jung | |
| 2018/0157355 A1* | 6/2018 | Kim | G06F 3/0412 |
| 2018/0364830 A1* | 12/2018 | Shepelev | G06F 3/0443 |
| 2019/0179446 A1* | 6/2019 | Kremin | G06F 3/0416 |
| 2019/0294270 A1* | 9/2019 | Wadhwa | G06F 3/041 |
| 2019/0294295 A1* | 9/2019 | Dong | H03F 3/45475 |
| 2020/0326815 A1* | 10/2020 | Choi | G06F 3/04184 |
| 2021/0055824 A1* | 2/2021 | Shen | G06F 3/044 |
| 2021/0200349 A1* | 7/2021 | Mohamed | G06F 3/0446 |
| 2021/0333924 A1* | 10/2021 | Finnoey | H03K 17/962 |
| 2021/0378088 A1* | 12/2021 | Lee | G06F 3/0446 |
| 2022/0123748 A1* | 4/2022 | Willis | G06F 3/0416 |
| 2022/0155937 A1 | 5/2022 | Jo et al. | |
| 2023/0185402 A1* | 6/2023 | Lee | G06F 3/0443 |
| | | | 345/174 |
| 2023/0305659 A1* | 9/2023 | Kim | H10K 59/873 |
| 2024/0069674 A1* | 2/2024 | Hong | G06F 3/04166 |

FOREIGN PATENT DOCUMENTS

| | | |
|---|---|---|
| KR | 10-2022-0067920 A | 5/2022 |
| KR | 10-2402648 B1 | 5/2022 |
| KR | 10-2022-0094119 A | 7/2022 |
| WO | 2010088653 A2 | 8/2010 |

\* cited by examiner

SENSOR DEVICE AND METHOD OF DRIVING THE SAME

This application claims priority to Korean Patent Application No. 10-2022-0142685, filed on Oct. 31, 2022, and all the benefits accruing therefrom under 35 U.S.C. § 119, the content of which in its entirety is herein incorporated by reference.

BACKGROUND

1. Field

The disclosure relates to a sensor device and a method of driving the same.

2. Description of the Related Art

As information technology develops, importance of a display device, which is a connection medium between a user and information, has been highlighted. In response to this, a use of a display device such as a liquid crystal display device and an organic light emitting display device is increasing.

The display device may include a sensor device. The sensor device may sense a touch of a user corresponding to an image of the display device and use the touch as an input signal. In this case, a driving signal supplied to sensors of the sensor device may act as noise to the display device, and thus display quality may be reduced. Conversely, signals for image display of the display device may act as noise to the sensor device, and thus sensing sensitivity may be reduced.

In order to avoid such electromagnetic interference (EMI), a method of changing a frequency band of the driving signal of the sensor device is proposed, but since various frequency bands are already used, finding an additional appropriate frequency band is a difficult problem. In addition, in order to avoid the EMI, a method of reducing the size of the driving signal of the sensor device is proposed, but there is a problem in that a signal to noise ratio (SNR) is reduced.

SUMMARY

An object to be solved is to provide a sensor device and a method of driving the same capable of reducing an EMI while maintaining an SNR without changing a frequency of a driving signal.

According to an embodiment of the disclosure, a sensor device may include first sensors, second sensors forming a capacitance with the first sensors, and a sensor driver configured to transmit driving signals to the first sensors and receive sensing signals from the second sensors. The sensor driver may simultaneously transmit driving signals to at least two of the first sensors during a first period and may not transmit driving signals to the rest of the first sensors during the first period, and the sensor driver may transmit an offset signal to at least one of the second sensors during the first period, and receive the sensing signals from at least two of the second sensors other than the at least one of the second sensors during the first period.

A first sensing frame period may include the first period and a second period subsequent to the first period. The sensor driver may transmit the driving signals to the at least two first sensors during the first period and the second period, and a waveform of the driving signals transmitted during the first period and a waveform of the driving signals transmitted during the second period may be different from each other.

Each of the driving signals may include the same number of pulses during the first period. The each of the driving signals may include at least one first sign of pulse and at least one second sign of pulse. A ratio of the at least one first sign of pulse to the at least one second sign of pulse in the each of the driving signals may be same.

A number of the at least one first sign of pulse included in each of the driving signals may be greater than a number of the at least one second sign of pulse included in each of the driving signals during the first period, the offset signal may include a plurality of second sign of pulses during the first period, and a number of the plurality of second sign of pulses included in the offset signal may be the same as the number of pulses included in each of the driving signals during the first period.

A first sensing frame period may include the first period, and the sensor driver may transmit the driving signals of a same waveform as the first period of the first sensing frame period to same first sensors during a first period of a second sensing frame period subsequent to the first sensing frame period.

During the second sensing frame period, the sensor driver may transmit the offset signal to a second sensor different from a second sensor to which the sensor driver transmits the offset signal during the first sensing frame period.

The sensor driver may include a plurality of sensor channels each of which may include an amplifier. A first input terminal of the amplifier may be connected to a corresponding second sensor and a second input terminal of the amplifier may be connected to a DC power source or a power source other than the DC power source.

The sensor driver may transmit the offset signal to the at least one of the second sensors during the first period and receive the sensing signals from the rest of the second sensors other than the at least one of the second sensors during the first period.

A second sensor disposed adjacent to a second sensor to which the offset signal is transmitted is floated during the first period.

A magnitude of absolute value of each pulses included in the offset signal may be less than a magnitude of absolute value of each pulses included in each of the driving signals.

According to an embodiment of the disclosure, a method of driving a sensor device including first sensors and second sensors forming a capacitance with the first sensors may include simultaneously transmitting driving signals to at least two first sensors during a first period and not transmitting driving signals to the rest of the first sensors during the first period, transmitting an offset signal to at least one of the second sensors during the first period, and receiving sensing signals from at least two of the second sensors other than the at least one of the second sensors during the first period.

A first sensing frame period may include the first period and a second period subsequent to the first period, the driving signals may be transmitted to same first sensors during the first period and the second period, and a waveform of the driving signals transmitted in the first period and a waveform of the driving signals transmitted in the second period may be different from each other.

Each of the driving signals may include the same number of pulses during the first period, and the driving signals may include at least one first sign of pulse and at least one second sign of pulse. A ratio of the at least one first sign of pulse to the at least one second sign of pulse in the each of the driving signals may be same.

A number of the at least one first sign of pulse included in each of the driving signals may be greater than a number of the at least one second sign of pulse included in each of the driving signal during the first period, the offset signal may include a plurality of second sign of pulses during the first period, and a number of the plurality of second sign of pulses included in the offset signal may be the same as a number of pulses included in each of the driving signals during the first period.

A first sensing frame period may include the first period, and the driving signals of a same waveform as the first period of the first sensing frame period may be transmitted to same first sensors during a first period of a second sensing frame period subsequent to the first sensing frame period.

During the second sensing frame period, the offset signal may be transmitted to a second sensor different from a second sensor to which the sensor driver transmits the offset signal during the first sensing frame period.

The sensor driver may include a plurality of sensor channels each of which may include an amplifier. The amplifier may include a first input terminal connected to a corresponding second sensor, and a second input terminal connected to a DC power source or a power other than the DC power source.

The offset signal may be transmitted to the at least one of the second sensors during the first period, and the sensing signals may be received from all of the rest of the second sensors during the first period.

A second sensor disposed adjacent to the second sensor to which the offset signal is transmitted may be floated during the first period.

A magnitude of absolute value of each pulses included in the offset signal may be less than a magnitude of absolute value of each pulses included in each of the driving signals.

The sensor device and the method of driving the same may reduce an EMI while maintaining an SNR without changing a frequency of a driving signal.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENT

Figure 1:
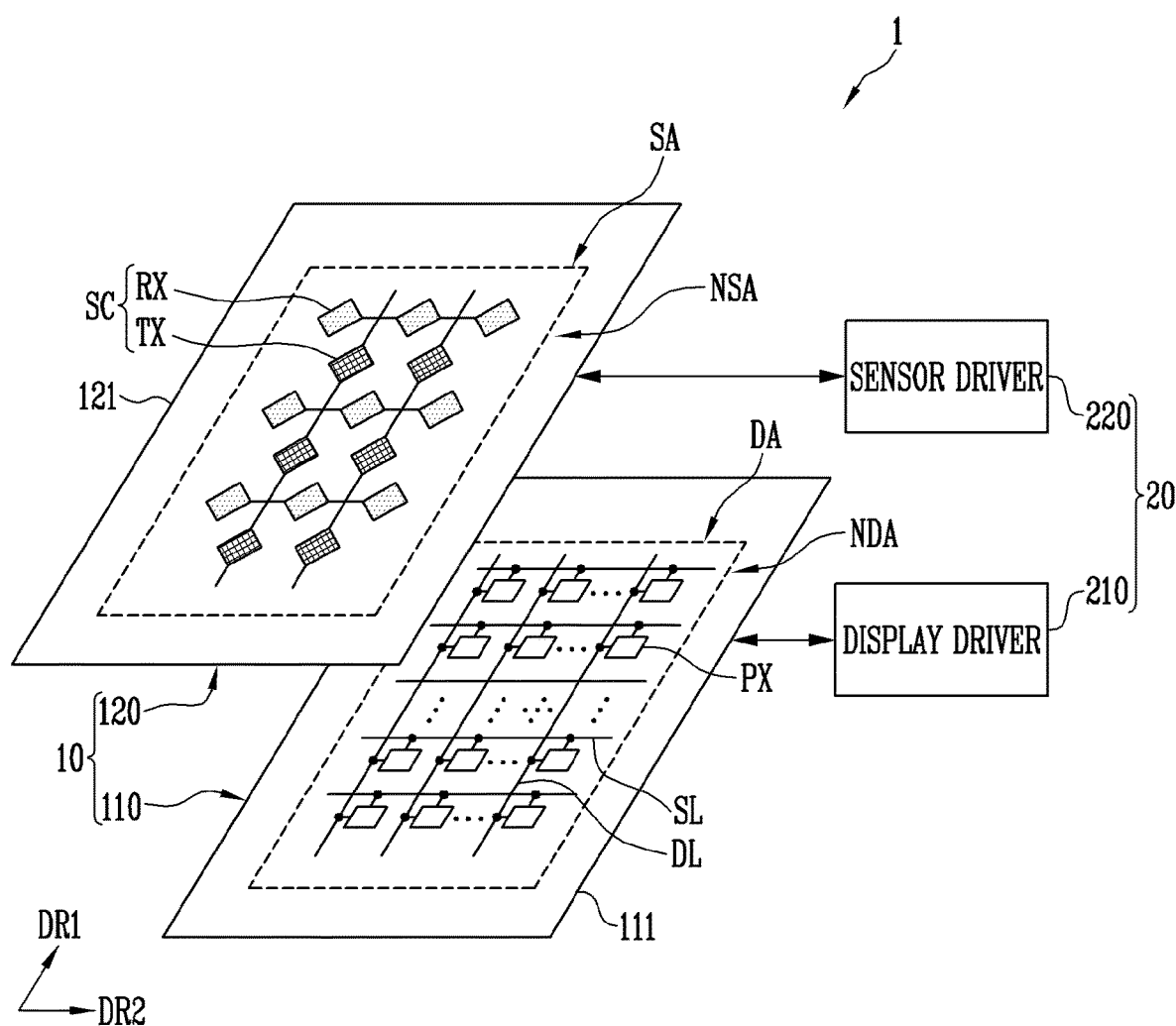
FIG. 1 is a diagram illustrating a display device according to an embodiment of the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same.". That is, the expression "is the same" may be the same enough for those of ordinary skill to understand that it is the same. Other expressions may also be expressions in which "substantially" is omitted.

FIG. 1 is a diagram illustrating a display device according to an embodiment of the disclosure.

Referring to FIG. 1, the display device 1 according to an embodiment of the disclosure may include a panel 10 and a driving circuit unit 20 for driving the panel 10.

For example, the panel 10 may include a display unit 110 for displaying an image and a sensor unit 120 for sensing touch, pressure, fingerprint, hovering, or the like. For example, the panel 10 may include pixels PX and sensors SC positioned to overlap at least a portion of the pixels PX. In an embodiment, the sensors SC may include first sensors TX and second sensors RX. In another embodiment (for example, in a self-capacitance method), the sensors SC may include one type of sensors without distinction between the first sensor and the second sensor. The driving circuit unit 20 may include a display driver 210 for driving the display unit 110 and a sensor driver 220 for driving the sensor unit 120. For example, the pixels PX may display an image in a display frame period unit. For example, the sensors SC may sense an input of a user in a sensing frame period unit. A sensing frame period and a display frame period may be independent from each other and may be different from each other. The sensing frame period and the display frame period may be synchronized with each other or may be asynchronized each other.

According to an embodiment, the display unit 110 and the sensor unit 120 may be separately manufactured, and then disposed and/or combined so that at least one area overlaps each other. Alternatively, in another embodiment, the display unit 110 and the sensor unit 120 may be integrally manufactured. For example, the sensor unit 120 may be directly formed on the display unit 110 (for example, an upper substrate and/or a lower substrate of the display panel, or a thin film encapsulation layer), or other insulating layers or various functional layer (for example, an optical layer or a protective layer).

Meanwhile, in FIG. 1, the sensor unit 120 is disposed on a front surface (for example, an upper surface on which an image is displayed) of the display unit 110, but a position of the sensor unit 120 is not limited thereto. For example, in another embodiment, the sensor unit 120 may be disposed on a back surface or both surfaces of the display unit 110. In still another embodiment, the sensor unit 120 may be disposed on at least one edge area of the display unit 110.

The display unit 110 may include a display substrate 111 and a plurality of pixels PXL formed on the display substrate 111. The pixels PXL may be disposed in a display area DA of the display substrate 111.

The display substrate 111 may include the display area DA where an image is displayed and a non-display area NDA outside the display area DA. According to an embodiment, the display area DA may be disposed in a center area of the display unit 110, and the non-display area NDA may be disposed in an edge area of the display unit 110 to surround the display area DA.

The display substrate 111 may be a rigid substrate or a flexible substrate, and a material or a physical property thereof is not particularly limited. For example, the display substrate 111 may be a rigid substrate formed of glass or tempered glass, or a flexible substrate formed of a thin film of a plastic or metal material.

Scan lines SL and data lines DL, and pixels PX connected to the scan lines SL and the data lines DL are disposed in the display area DA. The pixels PX is selected by a scan signal of a turn-on level supplied from the scan lines SL, receives a data signal from the data lines DL, and emits light of a luminance corresponding to the data signal. Therefore, an image corresponding to the data signal is displayed in the display area DA. In the disclosure, a structure, a driving method, and the like of the pixels PX are not particularly limited. For example, each of the pixels PX may be implemented as a pixel employing various currently known structures and driving methods.

In the non-display area NDA, various lines and/or a built-in circuit unit connected to the pixels PXL of the display area DA may be disposed. For example, a plurality of lines for supplying various power and control signals to the display area DA may be disposed in the non-display area NDA, and a scan driver or the like may be further disposed in the non-display area NDA.

In the disclosure, a type of the display unit 110 is not particularly limited. For example, the display unit 110 may be implemented as a self-emission type display panel such as an organic light emitting display panel. However, when the display unit 110 is implemented as a self-emission type, each pixel is not limited to a case where only an organic light emitting element is included. For example, a light emitting element of each pixel may include an organic light emitting diode, an inorganic light emitting diode, a quantum dot/well light emitting diode, or the like. A plurality of light emitting elements may be provided in each pixel. At this time, the plurality of light emitting elements may be connected in series, parallel, series-parallel, or the like. Alternatively, the display unit 110 may be implemented as a non-emission type display panel such as a liquid crystal display panel. When the display unit 110 is implemented as a non-emission type, the display device 1 may additionally include a light source such as a backlight unit.

The sensor unit 120 includes a sensor substrate 121 and a plurality of sensors SC formed on the sensor substrate 121. The sensors SC may be disposed in a sensing area SA on the sensor substrate 121.

The sensor substrate 121 may include the sensing area SA in which a touch input or the like may be sensed, and a peripheral area NSA outside the sensing area SA. According to an embodiment, the sensing area SA may be disposed to overlap at least one area of the display area DA. For example, the sensing area SA may be set to an area corresponding to the display area DA (for example, an area overlapping the display area DA), and the peripheral area NSA may be set to an area corresponding to the non-display area NDA (for example, an area overlapping the non-display area NDA). In this case, when a touch input or the like is provided on the display area DA, the touch input is detected through the sensor unit 120.

The sensor substrate 121 may be a rigid or flexible substrate, and may include at least one layer of insulating layer. In addition, the sensor substrate 121 may be a transparent or translucent light-transmitting substrate, but is not limited thereto. That is, in the disclosure, a material and a physical property of the sensor substrate 121 are not particularly limited. For example, the sensor substrate 121 may be a rigid substrate formed of glass or tempered glass, or a flexible substrate formed of a thin film of a plastic or metal material. In addition, according to an embodiment, at least one substrate (for example, the display substrate 111, an encapsulation substrate and/or a thin film encapsulation layer) configuring the display unit 110, at least one layer of insulating layer, functional layer, or the like disposed in an inside and/or on an outer surface of the display unit 110 may be used as the sensor substrate 121.

The sensing area SA is set as an area capable of responding to the touch input (that is, an active area of a sensor). To this end, the sensors SC for sensing the touch input or the like may be disposed in the sensing area SA. According to an embodiment, the sensors SC may include the first sensors TX and the second sensors RX.

For example, each of the first sensors TX may extend in a first direction DR1. The first sensors TX may be arranged to be spaced apart in a second direction DR2. The second direction DR2 may be different from the first direction DR1. For example, the second direction DR2 may be a direction orthogonal to the first direction DR1. In another embodiment, an extension direction and an arrangement direction of the first sensors TX may follow another conventional configuration. Each of the first sensors TX may include first cells of a relatively large area and first bridges each connected adjacent first cells each other and having a relatively narrow area. In FIG. 1, each of the first cells is shown in a diamond shape, but each of the first cells may have various conventional shapes such as a circle, a quadrangle, a triangle, and a mesh form. For example, the first bridges may be integrally formed with the first cells on the same layer as the first cells. In another embodiment, the first bridges may be formed on a layer different from that of the first cells and may electrically connect adjacent first cells.

For example, each of the second sensors RX may extend in the second direction DR2. The second sensors RX may be arranged to be spaced apart in the first direction DR1. In another embodiment, an extension direction and an arrangement direction of the second sensors RX may follow another conventional configuration. Each of the second sensors RX may include second cells of a relatively large area and second bridges each connecting adjacent second cells and having a relatively narrow area. In FIG. 1, each of the second cells is shown in a diamond shape, but each of the second cells may have various conventional shapes such as a circle, a quadrangle, a triangle, and a mesh form. For example, the second bridges may be integrally formed with the second cells on the same layer as the second cells. In another embodiment, the second bridges may be formed in a layer different from that of the second cells and may electrically connect adjacent second cells.

For example, the first cells of the first sensors TX, one of the first bridges of the first sensors TX and the second bridge of the second sensors RX, and the second cells of the second sensors RX may be formed of the same conductive layer. In this case, the other of the first bridges of the first sensors TX and the second bridges of the second sensors RX may be formed of different conductive layers with an insulating layer interposed between the one of the first bridges of the first sensors TX and the second bridge of the second sensors RX, and the other of the first bridges of the first sensors TX and the second bridges of the second sensors RX. For example, when the first bridges of the first sensors TX are formed on the same layer as the first cells and the second cells, the second bridges of the second sensors RX may be formed on a layer different from that on which the first bridges, the first cells, and the second cells are formed. For example, the second bridges of the second sensors RX and the first bridges of the first sensors TX may be disposed to overlap each other with the insulating layer interposed therebetween. Meanwhile, when the second bridges of the second sensors RX are formed on the same layer as the first cells and the second cells, the first bridges of the first sensors TX may be formed on a layer different from that on which the second bridges, the first cells, and the second cells are formed. For example, the second bridges of the second sensors RX and the first bridges of the first sensors TX may be disposed to overlap each other with the insulating layer interposed therebetween.

For another example, the first cells of the first sensors TX and the second cells of the second sensors RX may be formed on different layers with an insulating layer interposed therebetween. In this case, the first cells and the first bridges of the first sensors TX may be formed of a first conductive layer. In addition, the second cells and the second bridges of the second sensors RX may be formed of a second conductive layer which is different from the first conductive layer.

According to an embodiment, each of the first sensors TX and the second sensors RX may have conductivity and may be formed of at least one of a metal material, a transparent conductive material, and various other conductive materials. For example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), and platinum (Pt), or an alloy thereof. In this case, the first sensors TX and the second sensors RX may have a mesh shape. In addition, the first sensors TX and the second sensors RX may include at least one of various transparent conductive materials including silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nano tube, graphene, and the like. In addition, the first sensors TX and the second sensors RX may have conductivity and be formed of at least one of various conductive materials. In addition, each of the first sensors TX and the second sensors RX may be formed of a single layer or multiple layers, and a cross-sectional structure thereof is not particularly limited.

Meanwhile, the sensor lines for electrically connecting the sensors TX and RX to the sensor driver 220 and the like may be intensively disposed in the peripheral area NSA of the sensor unit 120.

The driving circuit unit 20 may include the display driver 210 for driving the display unit 110 and the sensor driver 220 for driving the sensor unit 120. In an embodiment, the display driver 210 and the sensor driver 220 may be embodied in different integrated chips (ICs) separated from each other. In another embodiment, at least a portion of the display driver 210 and the sensor driver 220 may be integrated together in one IC.

The display driver 210 is electrically connected to the display unit 110 to drive the pixels PX. For example, the display driver 210 may include a data driver and a timing controller, and the scan driver may be separately mounted in the non-display area NDA of the display 110. In another embodiment, the display driver 210 may include all or at least a portion of the data driver, the timing controller, and the scan driver.

The sensor driver 220 is electrically connected to the sensor unit 120 to drive the sensor unit 120. The sensor driver 220 may include a sensor transmitter and a sensor receiver. According to an embodiment, the sensor transmitter and the sensor receiver may be integrated into one IC, but are not limited thereto.

Figure 2:
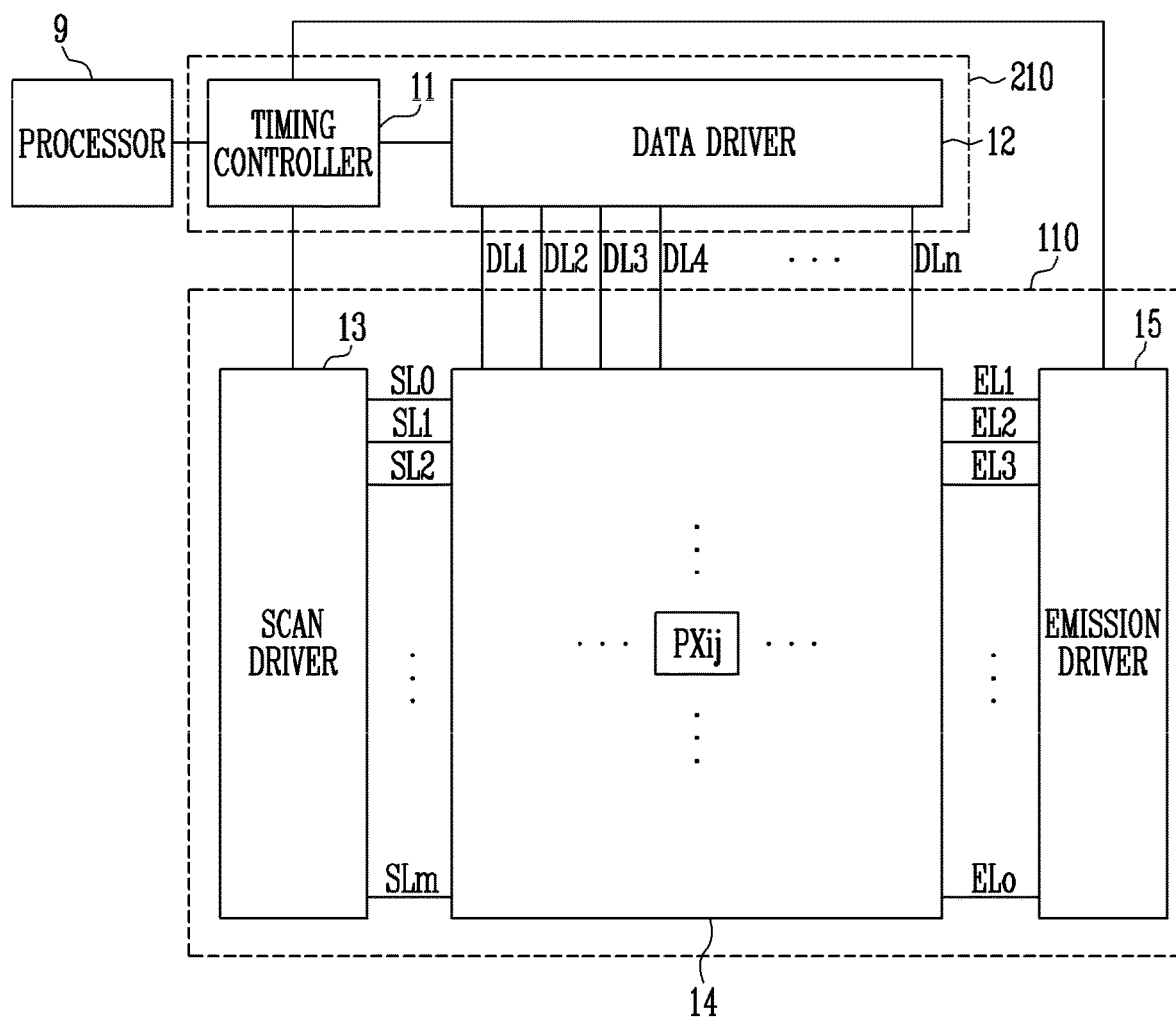
FIGS. 2, 3 and 4 are diagrams illustrating a display unit and a display driver according to an embodiment of the disclosure.
Figure 3:
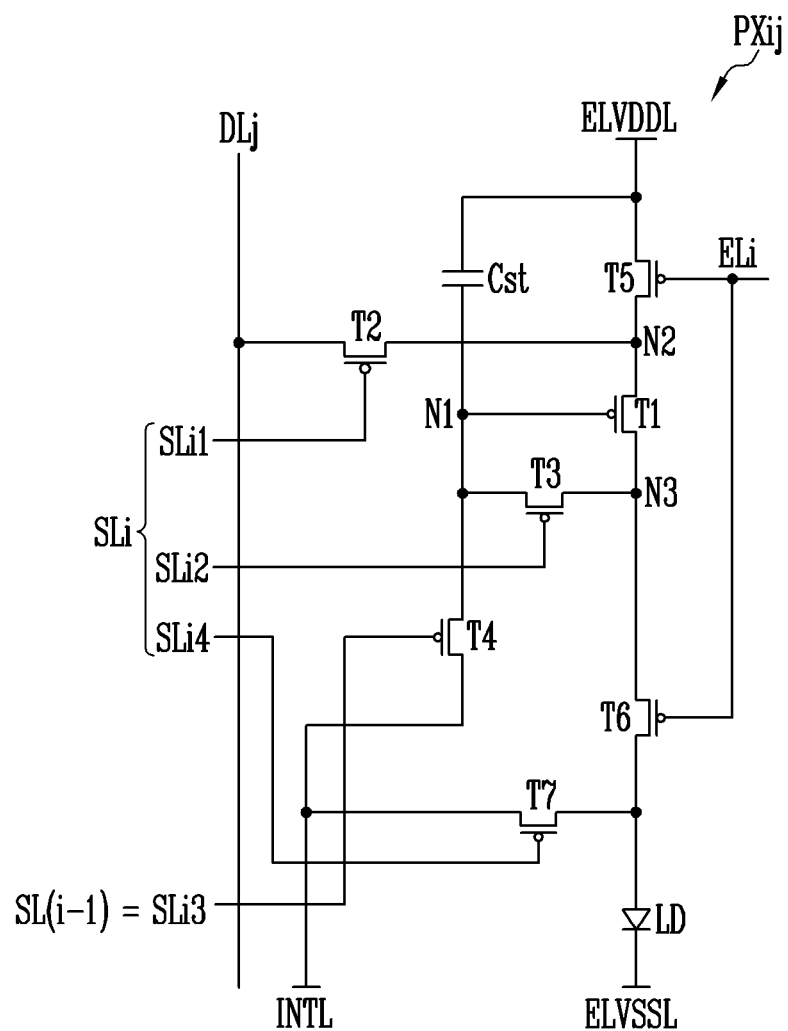
Figure 4:
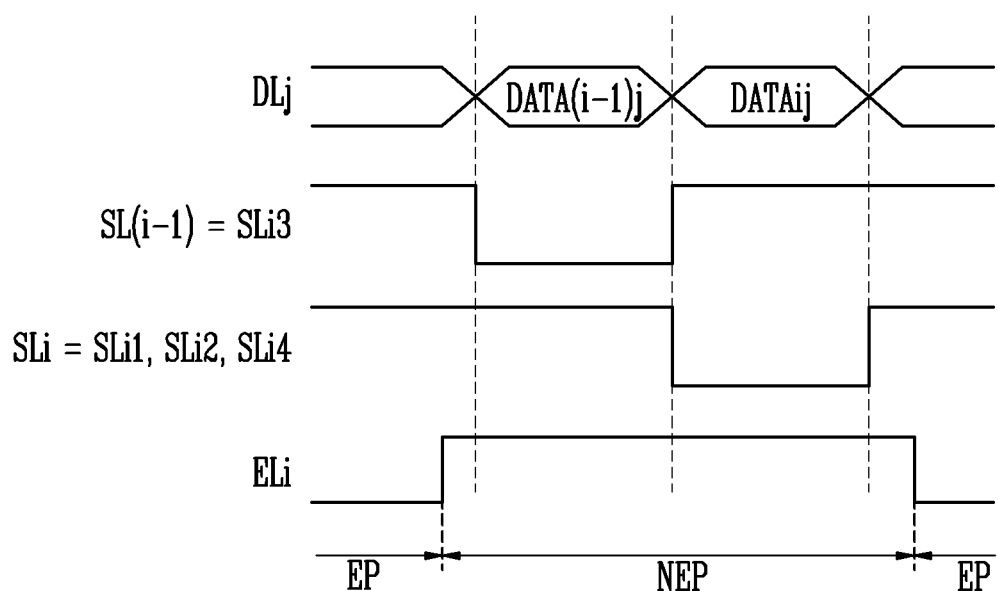

FIGS. 2 to 4 are diagrams illustrating a display unit and a display driver according to an embodiment of the disclosure.

Referring to FIG. 2, the display driver 210 may include a timing controller 11 and a data driver 12, and the display 110 may include a scan driver 13, a pixel unit 14, and an emission driver 15. However, as described above, whether each functional unit is integrated into one IC, integrated into a plurality of ICs, or mounted on the display substrate 111 may be variously configured according to a specification of the display device 1.

The timing controller 11 may receive grayscales and timing signals for each frame period from a processor 9. Here, the processor may correspond to at least one of a graphics processing unit (GPU), a central processing unit (CPU), an application processor (AP), and the like. The timing signals may include a vertical synchronization signal, a horizontal synchronization signal, a data enable signal, and the like.

Each cycle of the vertical synchronization signal may correspond to each frame period. Each cycle of the horizontal synchronization signal may correspond to each horizontal period. The grayscales may be supplied to the pixels PX one pixel row at a time in each horizontal period in response to a pulse of an enable level of the data enable signal. A horizontal line may mean pixels (for example, a pixel row) connected to the same scan line and emission line.

The timing controller 11 may render the grayscales to correspond to the specification of the display device 1. For example, the processor 9 may provide a red grayscale, a green grayscale, and a blue grayscale with respect to each unit dot. For example, when the pixel unit 14 has an RGB stripe structure, the pixels may correspond to each grayscale one-to-one. In this case, rendering of the grayscales may not be required. However, for example, when the pixel unit 14 has a PENTILE™ structure, since the pixel is shared by adjacent unit dots, the pixels may not correspond to each grayscale one-to-one. In this case, rendering of the grayscales may be required. The rendered or non-rendered grayscales may be provided to the data driver 12. In addition, the timing controller 11 may provide a data control signal to the data driver 12. In addition, the timing controller 11 may provide a scan control signal to the scan driver 13 and may provide an emission control signal to the emission driver 15.

The data driver 12 may generate data voltages (that is, data signals DLn) to be provided to data lines DL1, DL2, DL3, DL4, . . . , and DLn using the grayscales and the data control signal received from the timing controller 11, where 'n' may be an integer greater than 0.

The scan driver 13 may generate scan signals to be provided to scan lines SL0, SL1, SL2, . . . , and SLm using the scan control signal (for example, a clock signal, a scan start signal, and the like) received from the timing controller 11, where 'm' may be an integer greater than 0. The scan driver 13 may sequentially supply scan signals having a pulse of a turn-on level to the scan lines SL0 to SLm. The scan driver 13 may include scan stages which are embodied in a form of a shift register. The scan driver 13 may generate the scan signals in a method of sequentially transferring the scan start signal that is a pulse form of a turn-on level to a next scan stage according to control of the clock signal.

The emission driver 15 may generate emission signals to be provided to emission lines EL1, EL2, EL3, . . . , and ELo using the emission control signal (for example, a clock signal, an emission stop signal, and the like) received from the timing controller 11, where 'o' may be an integer greater than 0. The emission driver 15 may sequentially supply emission signals having a pulse of a turn-off level to the emission lines EL1 to ELo. The emission driver 15 may include emission stages which are embodied in a form of a shift register. The emission driver 15 may generate the emission signals in a method of sequentially transferring the emission stop signal that is a pulse form of a turn-off level to a next emission stage according to control of the clock signal.

The pixel unit 14 includes the pixels. Each pixel PXij may be connected to corresponding data line, scan line, and emission line. The pixels may include pixels emitting light of a first color, pixels emitting light of a second color, and pixels emitting light of a third color. The first color, the second color, and the third color may be different colors. For example, the first color may be one of red, green, and blue, the second color may be one other than the first color among red, green, and blue, and the third color may be one other than the first color and the second color among red, green, and blue. In addition, magenta, cyan, and yellow may be used instead of red, green, and blue as the first to third colors.

FIG. 3 is a diagram illustrating a pixel according to an embodiment of the disclosure.

Referring to FIG. 3, the pixel PXij includes transistors T1, T2, T3, T4, T5, T6, and T7, a storage capacitor Cst, and a light emitting element LD.

Hereinafter, a circuit including a P-type transistor is described as an example. However, those skilled in the art will be able to design a circuit including an N-type transistor by differentiating a polarity of a voltage applied to a gate terminal. Similarly, those skilled in the art will be able to design a circuit including a combination of a P-type transistor and an N-type transistor. The P-type transistor is collectively referred to as a transistor in which a current amount increases when a voltage difference between a gate electrode and a source electrode increases in a negative direction. The N-type transistor is collectively referred to as a transistors in which a current amount increases when a voltage difference between a gate electrode and a source electrode increases in a positive direction. The transistor may have various forms such as a thin film transistor (TFT), a field effect transistor (FET), and a bipolar junction transistor (BJT).

The first transistor T1 may have a gate electrode connected to a first node N1, a first electrode connected to a second node N2, and a second electrode connected to a third node N3. The first transistor T1 may be referred to as a driving transistor.

The second transistor T2 may have a gate electrode connected to a scan line SLi1, a first electrode connected to a data line DLj, and a second electrode connected to the second node N2. The second transistor T2 may be referred to as a scan transistor.

The third transistor T3 may have a gate electrode connected to a scan line SLi2, a first electrode connected to the first node N1, and a second electrode connected to the third node N3. The third transistor T3 may be referred to as a diode connection transistor.

The fourth transistor T4 may have a gate electrode connected to a scan line SLi3, a first electrode connected to the first node N1, and a second electrode connected to an initialization line INTL. The fourth transistor T4 may be referred to as a gate initialization transistor.

The fifth transistor T5 may have a gate electrode connected to an i-th emission line ELi, a first electrode connected to a first power line ELVDDL, and a second electrode connected to the second node N2. The fifth transistor T5 may be referred to as an emission transistor.

The sixth transistor T6 may have the gate electrode connected to the i-th emission line ELi, a first electrode connected to the third node N3, and a second electrode connected to an anode of the light emitting element LD. The sixth transistor T6 may be referred to as an emission transistor. In another embodiment, the gate electrode of the sixth transistor T6 may be connected to an emission line different from the emission line connected to the gate electrode of the fifth transistor T5.

The seventh transistor T7 may have a gate electrode connected to a scan line SLi4, a first electrode connected to the initialization line INTL, and a second electrode connected to the anode of the light emitting element LD. The seventh transistor T7 may be referred to as a light emitting element initialization transistor.

A first electrode of the storage capacitor Cst may be connected to the first power line ELVDDL and a second electrode may be connected to the first node N1.

The anode of the light emitting element LD may be connected to the second electrode of the sixth transistor T6 and a cathode may be connected to a second power line ELVSSL. The light emitting element LD may be a light emitting diode. The light emitting element LD may be an organic light emitting element (organic light emitting diode), an inorganic light emitting element (inorganic light emitting diode), a quantum dot/well light emitting element (quantum dot/well light emitting diode), or the like. The light emitting element LD may emit light in any one of the first color, the second color, and the third color. In addition, although only one light emitting element LD is provided in each pixel in the present embodiment, a plurality of light emitting elements may be provided in each pixel in another embodiment. In this case, the plurality of light emitting elements may be connected in series, parallel, series-parallel, or the like.

The first power line ELVDDL may be supplied with a first power voltage, the second power line ELVSSL may be supplied with a second power voltage, and the initialization line INTL may be supplied with an initialization voltage. For example, the first power voltage may be greater than the second power voltage. For example, the initialization voltage may be equal to or greater than the second power voltage. For example, the initialization voltage may correspond to a data voltage of the smallest size among data voltages that may be provided. In another example, the initialization voltage may be lower than the data voltages that may be provided.

FIG. 4 is a diagram illustrating a method of driving the pixel of FIG. 3.

Hereinafter, for convenience of description, it is assumed that the scan lines SLi1, SLi2, and SLi4 are i-th scan lines SLi and the scan line SLi3 is an (i−1)-th scan line SL(i−1). However, a connection relationship of the scan lines SLi1, SLi2, SLi3, and SLi4 may be various according to embodiments. For example, the scan line SLi4 may be the (i−1)-th scan line or an (i+1)-th scan line.

First, an emission signal of a turn-off level (logic high level) is applied to the i-th emission line ELi, a data voltage DATA(i−1)j for an (i−1)-th pixel is applied to the data line DLj, and a scan signal of a turn-on level (logic low level) is applied to the scan line SLi3. The high/low of the logic level may vary according to whether a transistor is a P-type or an N-type.

At this time, since a scan signal of a turn-off level is applied to the scan lines SLi1 and SLi2, the second transistor T2 is turned off and the data voltage DATA(i−1)j is prevented from being input to the pixel PXij.

At this time, since the fourth transistor T4 is turned on, the first node N1 is connected to the initialization line INTL, and a voltage of the first node N1 is initialized. Since the emission signal of the turn-off level is applied to the emission line Ei, the transistors T5 and T6 are turned off, and light emission of an unnecessary light emitting element LD according to an initialization voltage application process is prevented.

Next, a data voltage DATAij for the i-th pixel PXij is applied to the data line DLj, and the scan signal of the turn-on level is applied to the scan lines SLi1 and SLi2. Accordingly, the transistors T2, T1, and T3 are turned on, and the data line DLj and the first node N1 are electrically connected with each other. Therefore, a compensation voltage obtained by subtracting a threshold voltage of the first transistor T1 from the data voltage DATAij is applied to the second electrode of the storage capacitor Cst (that is, the first node N1), and the storage capacitor Cst maintains a voltage corresponding to a difference between the first power voltage and the compensation voltage. Such a period may be referred to as a threshold voltage compensation period or a data writing period.

In addition, when the scan line SLi4 is the i-th scan line, since the seventh transistor T7 is turned on, the anode of the light emitting element LD and the initialization line INTL are connected with each other, and the light emitting element LD is initialized to a charge amount corresponding to a voltage difference between the initialization voltage and the second power voltage.

Thereafter, as the emission signal of the turn-on level is applied to the i-th emission line ELi, the transistors T5 and T6 may be turned on. Therefore, a driving current path connecting the first power line ELVDDL, the fifth transistor T5, the first transistor T1, the sixth transistor T6, the light emitting element LD, and the second power line ELVSSL is formed.

A driving current amount flowing to the first electrode and the second electrode of the first transistor T1 is adjusted according to the voltage maintained in the storage capacitor Cst. The light emitting element LD emits light with a luminance corresponding to the driving current amount. The light emitting element LD emits light until the emission signal of the turn-off level is applied to the emission line Ei.

When the emission signal is the turn-on level, pixels receiving the corresponding emission signal may be in a display state. Therefore, a period in which the emission signal is the turn-on level may be referred to as an emission period EP (or an emission allowable period). In addition, when the emission signal is the turn-off level, pixels receiving the corresponding emission signal may be in a non-display state. Therefore, a period in which the emission signal is the turn-off level may be referred to as a non-emission period NEP (or an emission disallowable period).

The non-emission period NEP described with reference to FIG. 4 is for preventing the pixel PXij from emitting light with an undesired luminance during the initialization period and the data writing period.

One or more non-emission periods NEP may be additionally provided while data written to the pixel PXij is maintained (for example, one frame period). This may be for effectively expressing a low grayscale by reducing the emission period EP of the pixel PXij, or for smoothly blurring a motion of an image.

Figure 5:
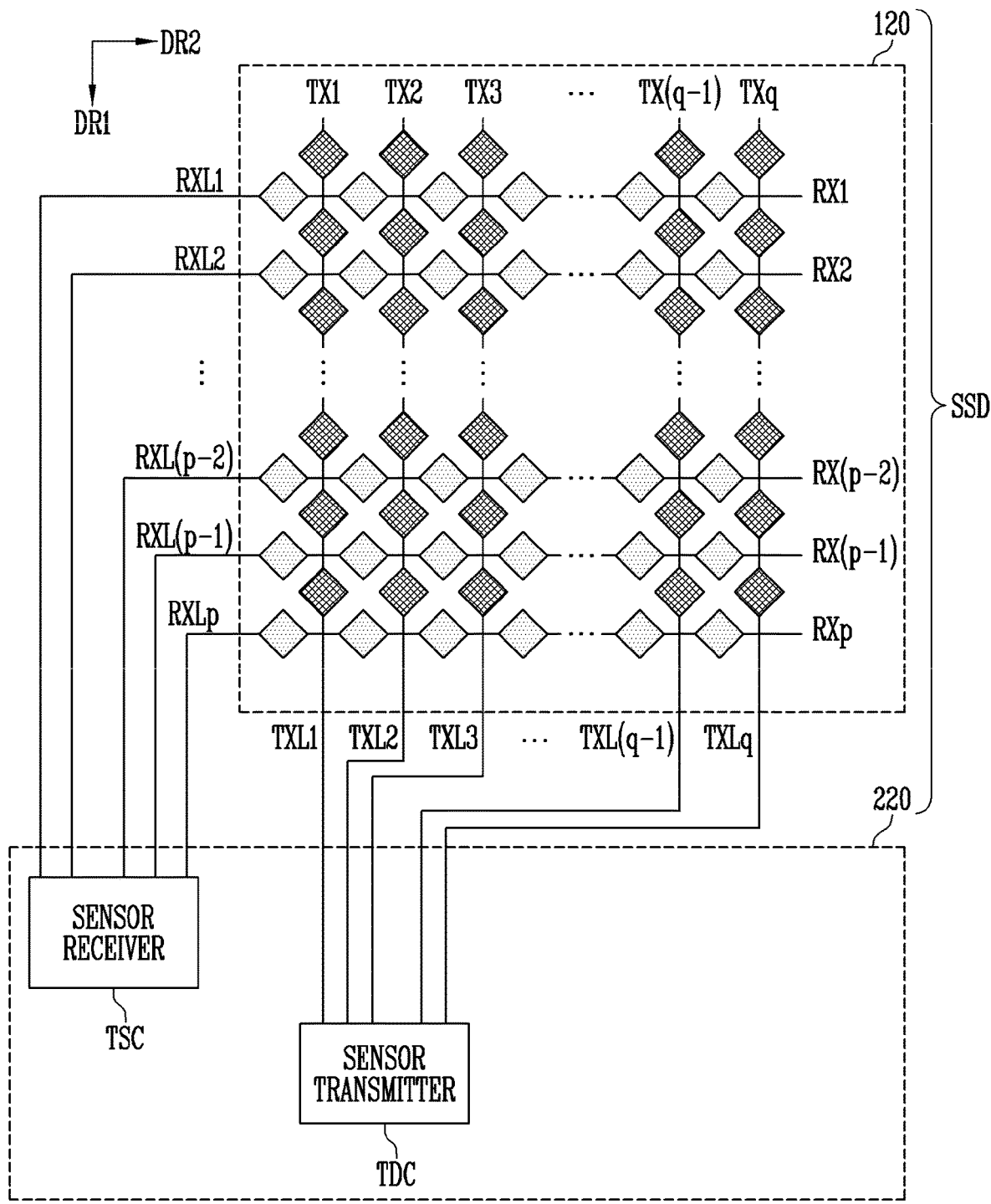
FIG. 5 is a diagram illustrating a sensor device according to an embodiment of the disclosure.

FIG. 5 is a diagram illustrating a sensor device according to an embodiment of the disclosure.

Referring to FIG. 5, the sensor device SSD according to an embodiment of the disclosure may include the sensor unit 120 and the sensor driver 220. The sensor device SSD may be included in the display device 1.

The sensor unit 120 may include first sensors TX1, TX2, TX3, . . . , TX(q−1), and TXq and second sensors RX1, RX2, . . . , RX(p−2), RX(p−1), and RXp. Each of p and q may be an integer greater than 0. The first sensors TX1 to TXq may extend in the first direction DR1 and may be arranged to be spaced apart in the second direction DR2. The second sensors RX1 to RXp may extend in the second direction DR2 and may be arranged to be spaced apart in the first direction DR1. The second sensors RX1 to RXp may cross the first sensors TX1 to TXq. The second sensors RX1 to RXp may form a mutual capacitance with first sensors TX1 to TXq. The sensor driver 220 may sense a change of capacitances and determine whether or not a touch of a user is input.

The sensor driver 220 may include a sensor receiver TSC and a sensor transmitter TDC. The sensor transmitter TDC may be connected to the first sensors TX1 to TXq and supply driving signals to the first sensors TX1 to TXq. The sensor transmitter TDC may be connected to the first sensors TX1 to TXq through first sensor lines TXL1, TXL2, TXL3, . . . , TXL(q−1), and TXLq.

The sensor receiver TSC may be connected to the second sensors RX1 to RXp and receive sensing signals from the second sensors RX1 to RXp. The sensor receiver TSC may be connected to the second sensors RX1 to RXp through second sensor lines RXL1, RXL2, . . . , RXL(p−2), RXL(p−1), and RXLp. According to an embodiment, the sensor receiver TSC may transmit an offset signal to some of the second sensors RX1 to RXp.

Figure 6:
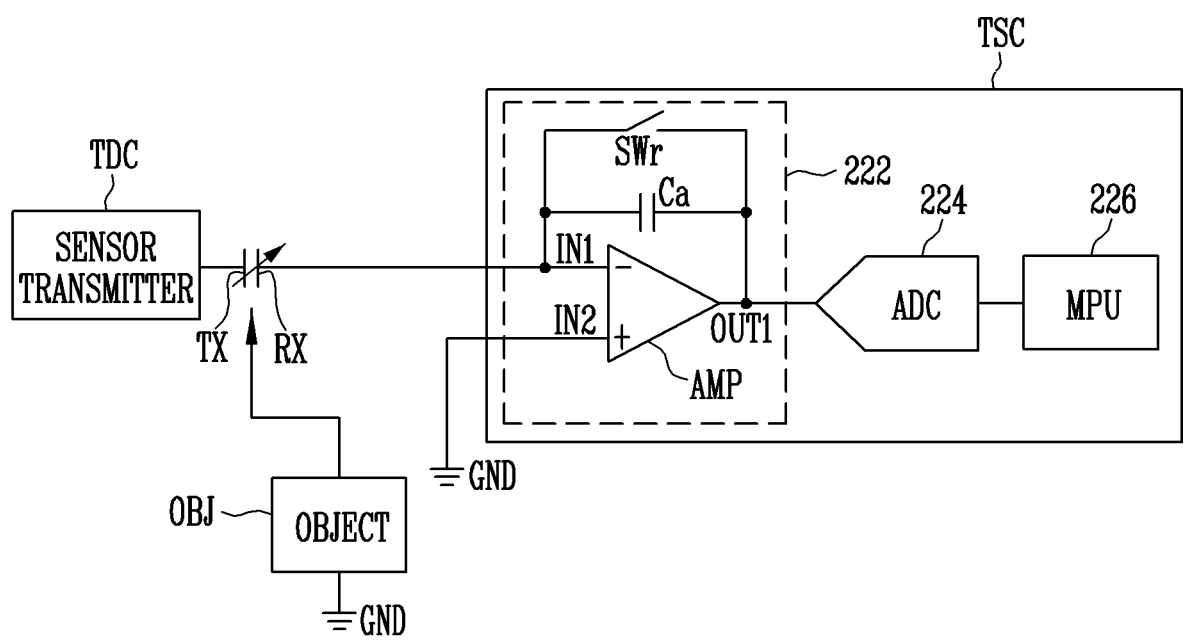
FIG. 6 is a diagram illustrating a sensor driver according to an embodiment of the disclosure.

FIG. 6 is a diagram illustrating a sensor driver according to an embodiment of the disclosure.

The sensor transmitter TDC may be connected to the first sensors TX, and the sensor receiver TSC may be connected to the second sensors RX.

The sensor receiver TSC may include an amplifier AMP, an analog-to-digital converter 224, and a sensor processor 226. For example, each sensor channel 222 may be implemented with an analog front end (AFE) including at least one amplifier AMP. The number of each of the analog-to-digital converters 224 and the sensor processors 226 may be less than the number of the sensor channels 222. For example, each of the analog-to-digital converter 224 and the sensor processor 226 may be shared by a plurality of sensor channels 222. According to an embodiment, the number of each of the analog-to-digital converters 224 and the sensor processors 226 may be the same as the number of the sensor channels 222.

In the amplifier AMP, a first input terminal IN1 may be connected to a corresponding second sensor, and a second input terminal IN2 may be connected to power GND. Here, the power GND may be DC power. For example, the power GND may be ground. For example, the first input terminal IN1 may be an inverted terminal, and the second input terminal IN2 may be a non-inverted terminal.

The analog-to-digital converter 224 may be connected to an output terminal OUT1 of the amplifier AMP. A capacitor Ca and a switch SWr may be connected in parallel between the first input terminal IN1 and the output terminal OUT1.

The sensor receiver TSC may include a plurality of sensor channels 222 connected to a plurality of second sensors RX. Each of the sensor channels 222 may receive a sensing signal from a corresponding second sensor. For example, when the sensor transmitter TDC transmits driving signals to the first sensors TX, the sensor receiver TSC may sense mutual capacitances of the first sensors TX and the second sensors RX through sensing signals.

The mutual capacitance between the first sensors TX and the second sensors RX may be different from each other according to a position of an object OBJ, such as a finger of the user, on the sensing area SA, and thus the sensing signals received by sensor channels 222 may also be different from each other. The position of the object OBJ may be detected using a difference in capacitance between the sensing signals.

The sensor channel 222 may generate an output signal corresponding to a voltage difference between the first and second input terminals IN1 and IN2. For example, the sensor channel 222 may amplify a voltage difference between the first and second input terminals IN1 and IN2 at a degree corresponding to a predetermined gain and output the amplified voltage difference.

According to an embodiment, the sensor channel 222 may be implemented with an integrator. In this case, a capacitor Ca and a switch SWr may be connected in parallel between the first input terminal IN1 and the output terminal OUT1 of the amplifier AMP. For example, the switch SWr may be turned on before receiving the sensing signal, and thus charges of the capacitor Ca may be initialized. At a time point when the sensing signal is received, the switch SWr may be in a turn-off state.

The analog-to-digital converter 224 converts an analog signal input from each of the sensor channels 222 into a digital signal. The sensor processor 226 may analyze the digital signal to detect a user input.

Figure 7:
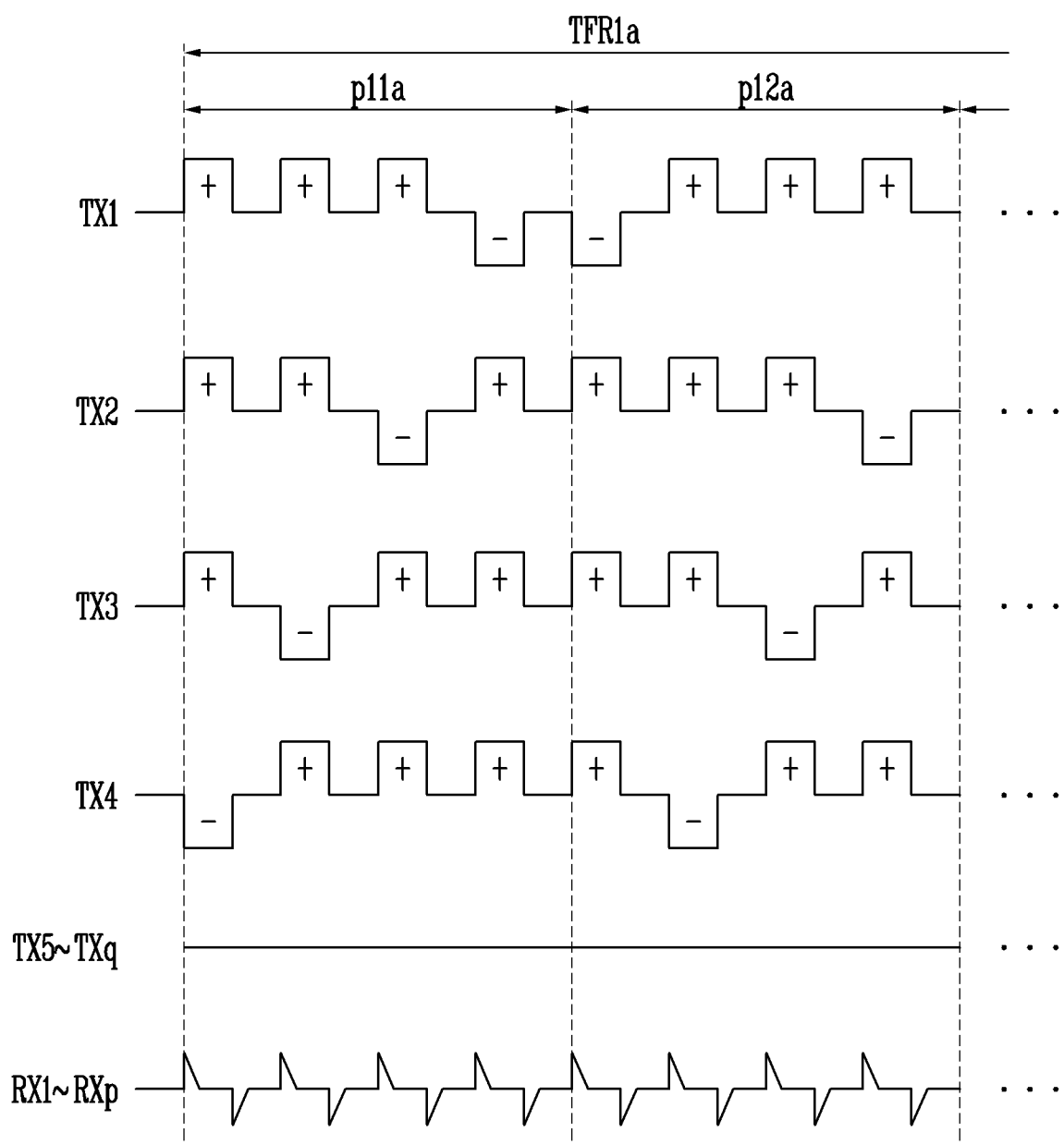
FIG. 7 is a diagram illustrating a method of driving a sensor device according to an embodiment of the disclosure.

FIG. 7 is a diagram illustrating a method of driving a sensor device according to an embodiment of the disclosure.

FIG. 7 shows signals applied to the first sensors TX1 to TXq and the second sensors RX1 to RXp during a first period p11a and a second period p12a among a plurality of periods included in a first sensing frame period TFR1a.

The sensor transmitter TDC may simultaneously transmit the driving signals to some TX1, TX2, TX3, and TX4 of the first sensors TX1 to TXq during the first period p11a, and may not transmit the driving signals to the rest TX5 to TXq of the first sensors TX1 to TXq during the first period p11a. The first sensors TX5 to TXq to which the driving signals are not transmitted may be floated, or a specific DC voltage may be applied to the first sensors TX5 to TXq to which the driving signals are not transmitted.

The sensor transmitter TDC may increase an SNR by simultaneously transmitting the driving signals to the plurality of first sensors TX1, TX2, TX3, and TX4 during the first period p11a. Each of the driving signals may include the same number of pulses during the first period p11a. For example, each of the driving signals may include four pulses during the first period p11a. The driving signals may include at least one first sign (+) of pulse and at least one second sign (−) of pulse at the same ratio during the first period p11a. For example, each of the driving signals may include three first sign (+) of pulses and one second sign (−) of pulse during the first period p11a.

The first sensing frame period TFR1a may include the first period p11a and the second period p12a subsequent to the first period p11a. The sensor transmitter TDC may transmit the driving signals to the same first sensors TX1, TX2, TX3, and TX4 during the first period p11a and the second period p12a, and a waveform of the driving signals transmitted in the first period p11a and a waveform of the driving signals transmitted in the second period p12a may be different from each other. For example, during the first period p11a, the sensor transmitter TDC may transmit the second sign (−) of pulse of the first sensor TX1 as a fourth pulse, transmit the second sign (−) of pulse of the first sensor TX2 as a third pulse, transmit the second sign (−) of pulse of the first sensor TX3 as a second pulse, and transmit the second sign (−) of pulse of the first sensor TX4 as a first pulse. Meanwhile, during the second period p12a, the sensor transmitter TDC may transmit the second sign (−) of pulse of the first sensor TX1 as a first pulse, transmit the second sign (−) of pulse of the first sensor TX2 as a fourth pulse, transmit the second sign (−) of pulse of the first sensor TX3 as a third pulse, and transmit the second sign (−) of pulse of the first sensor TX4 as a second pulse.

As described above, even though the sensor transmitter TDC transmits the driving signals to the same first sensors TX1, TX2, TX3, and TX4, the sensor receiver TSC may determine a first sensor on which the touch occurs among the first sensors TX1, TX2, TX3, and TX4, by differentiating a phase of the driving signals. For example, when the touch is sensed during the first period p11a, the sensor receiver TSC may determine that the touch occurs on the first sensor TX1. Meanwhile, when the touch is sensed during the second period p12a, the sensor receiver TSC may determine that the touch occurs on the first sensor TX2. Similarly, during a third period subsequent to the second period and a fourth period subsequent to the third period, the sensor transmitter TDC may transmit the driving signals of which the phases are different to the same first sensors TX1, TX2, TX3, and TX4, respectively, in order to allow the sensor receiver TSC to discriminate whether the touch occurs on the first sensor TX3 or on the first sensor TX4.

Similarly, during the fifth to eighth periods subsequent to the fourth period, the sensor transmitter TDC may transmit the driving signals of which the phases are different to the same first sensors TX5, TX6, TX7 and TX8, respectively, in order to allow the sensor receiver TSC to discriminate a first sensor on which the touch occurs among the first sensors TX5, TX6, TX7 and TX8.

However, the phases of the driving signals transmitted from the sensor transmitter TDC and an interpretation of the phases by the sensor receiver TSC may vary according to a predetermined algorithm for each manufacturer.

The sensor receiver TSC may receive the sensing signals from all of the second sensors RX1 to RXp during the first period p11a. When a user touch occurs during the first period p11a, the sensor receiver TSC may determine a cross point of the second sensor corresponding to the sensor channel 222 where the touch is sensed and the first sensor TX1 corresponding to the first period p11a as a touch position. Similarly, the sensor receiver TSC may receive the sensing signals from all of the second sensors RX1 to RXp during the second period p12a. When the user touch occurs during the second period p12a, the sensor receiver TSC may determine a cross point of the second sensor corresponding to the sensor channel 222 where the touch is sensed and the first sensor TX2 corresponding to the second period p12a as a touch position.

In an embodiment of FIG. 7, the DC power GND may be applied to the second sensors RX1 to RXp during the first sensing frame period TFR1a as described with reference to FIG. 6.

Figure 8:
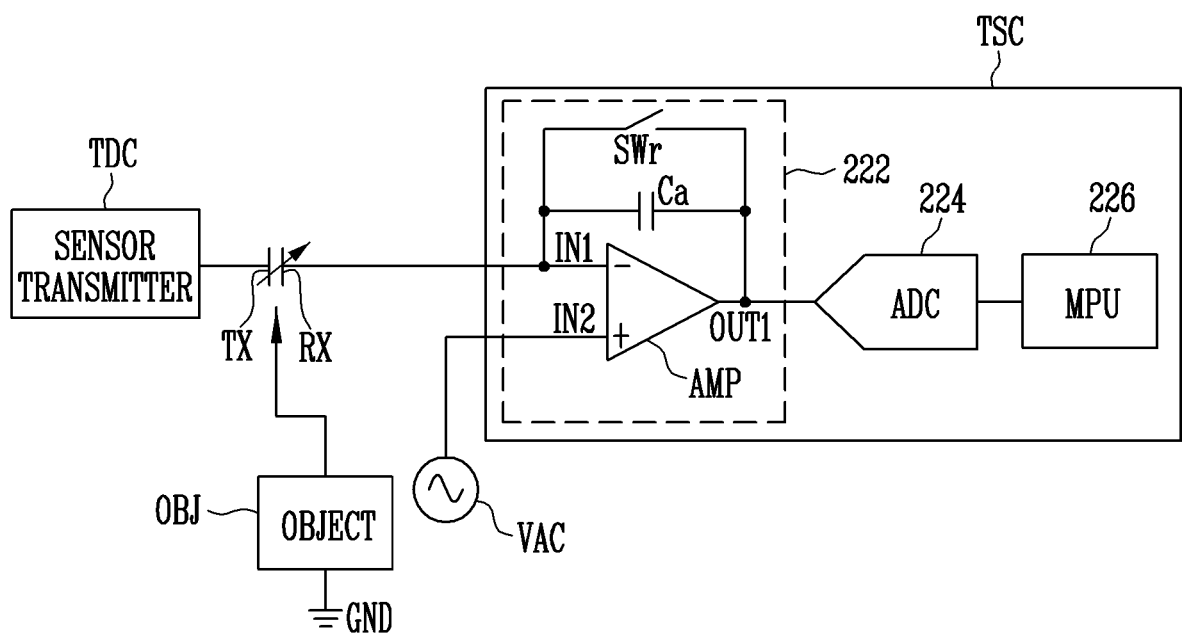
FIGS. 8, 9 and 10 are diagrams illustrating a method of driving a sensor device according to another embodiment of the disclosure.
Figure 9:
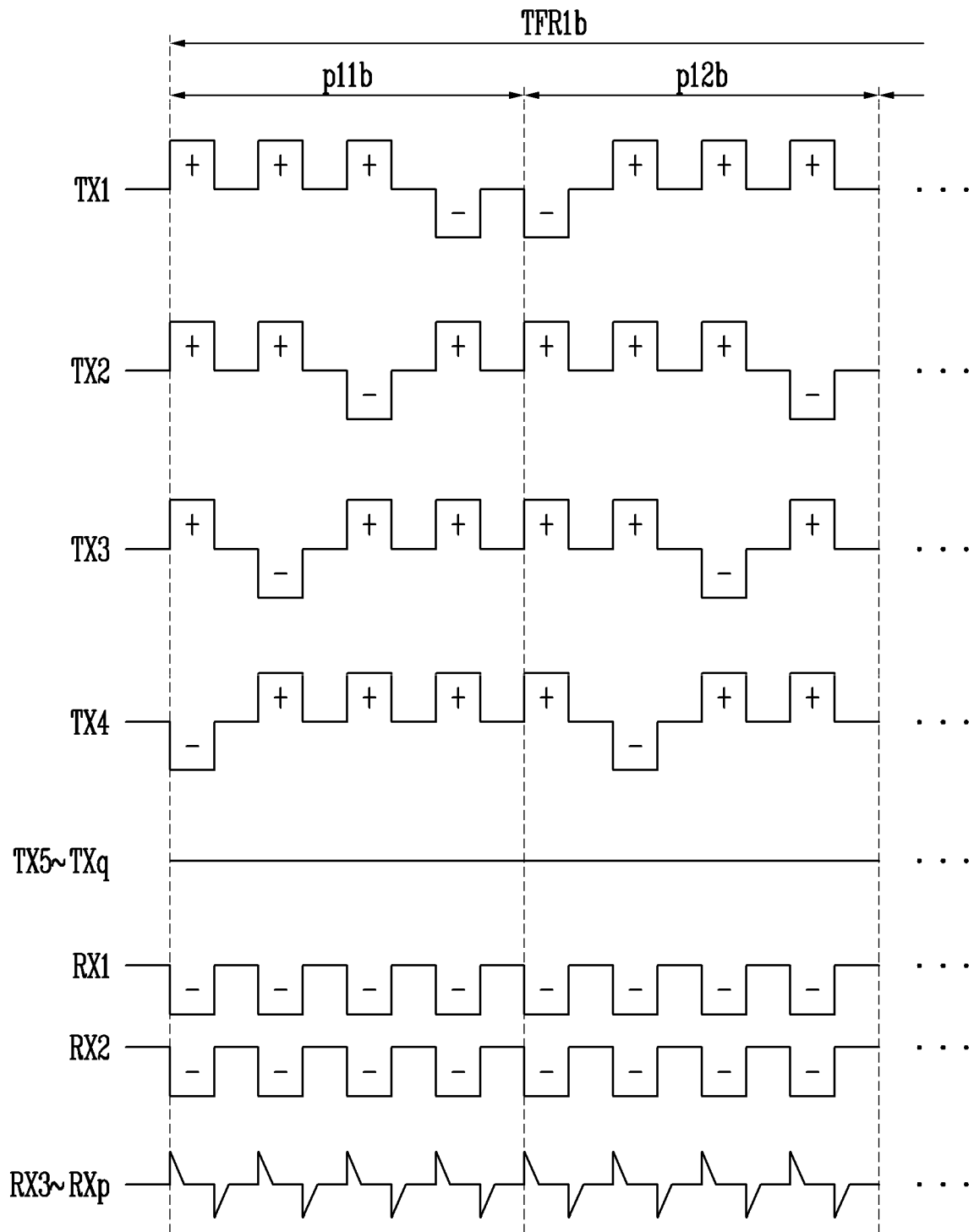
Figure 10:
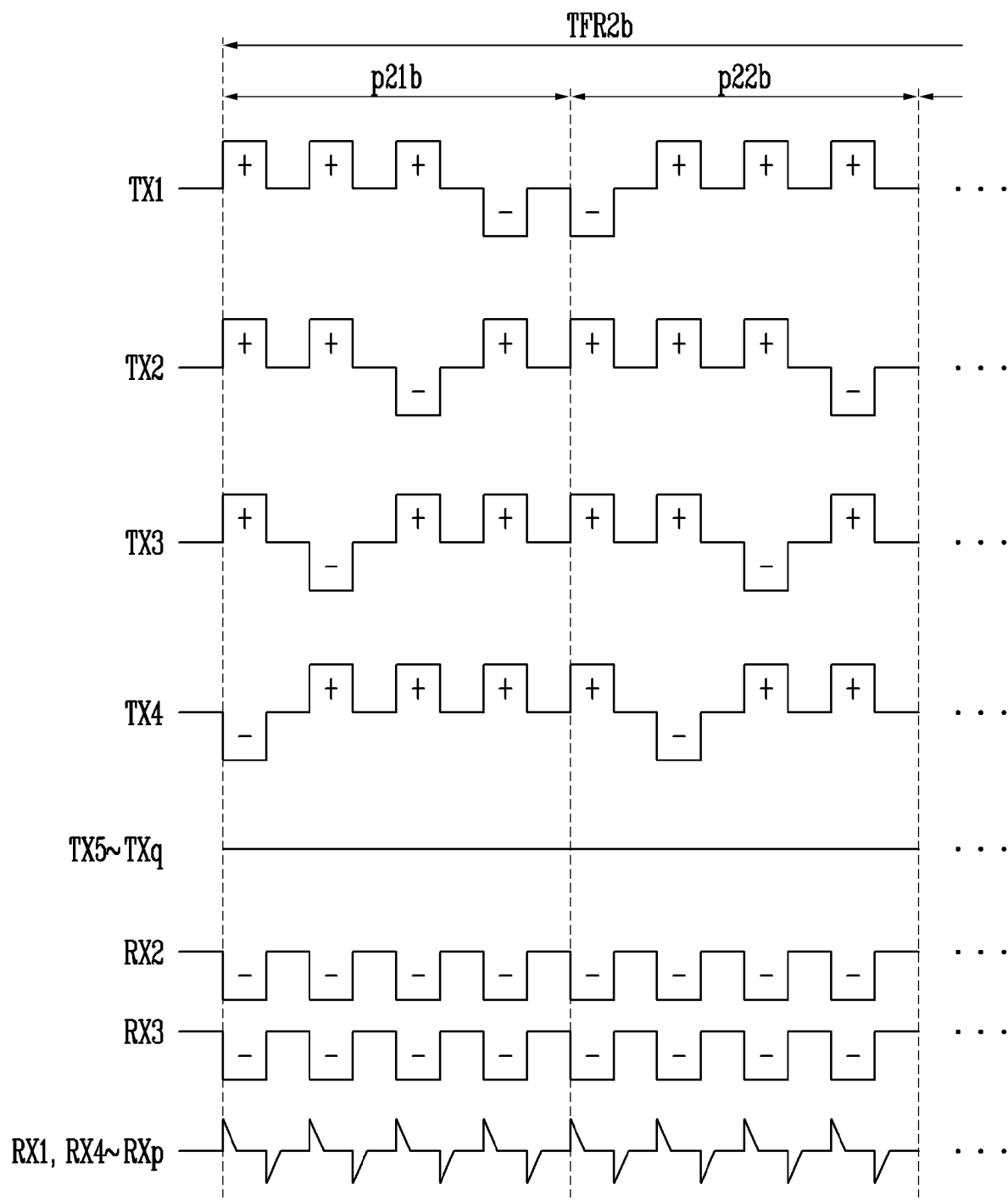

FIGS. 8 to 10 are diagrams illustrating a method of driving a sensor device according to another embodiment of the disclosure.

Referring to FIG. 8, power VAC other than DC power may be connected to the second input terminal IN2 of the amplifier AMP included in some of the sensing channels 222. Referring to FIG. 9, power VAC other than DC power may be connected to the second input terminal IN2 of the amplifier AMP included in each of the sensing channels 222 connected to the second sensors RX1 and RX2. The power VAC may be AC power. Meanwhile, the power VAC may sequentially generate second sign (−) of pulses.

A process of operating the sensor transmitter TDC in a first sensing frame period TFR1b of FIG. 9 is the same as a process of operating the sensor transmitter TDC in the first sensing frame period TFR1a of FIG. 7. In addition, a process of operating the sensor transmitter TDC in a second sensing frame period TFR2b of FIG. 10 is the same as a process of operating the sensor transmitter TDC in the first sensing frame period TFR1b of FIG. 9. For example, during a first period p21b of the second sensing frame period TFR2b subsequent to the first sensing frame period TFR1b, driving signals of the same waveform as a first period p11b of the first sensing frame period TFR1b may be transmitted to the same first sensors TX1 to TX4. Therefore, a repetitive description of the sensor transmitter TDC is omitted.

The sensor receiver TSC may transmit the offset signal to at least one of the second sensors RX1 to RXp during the first period p11b, and receive the sensing signals from some RX3 to RXp of the second sensors RX1 to RXp during the first period p11b. For example, the sensor receiver TSC may transmit the offset signal to at least one or more RX1 and RX2 of the second sensors RX1 to RXp during the first period p11b, and receive the sensing signals from all of the rest RX3 to RXp of the second sensors RX1 to RXp during the first period p11b. To this end, for example, the sensor receiver TSC may connect the power VAC other than DC power to the second sensors RX1 and RX2 as shown in FIG. 8 during the first period p11b, and connect the DC power GND to the second sensors RX3 to RXp as shown in FIG. 6.

During the first period p11b, the number of at least one first sign (+) of pulse included in each of the driving signals may be greater than that of at least one second sign (−) of pulse. For example, during the first period p11b, the driving signal applied to the first sensor TX1 may include three first sign (+) of pulses and one second sign (−) of pulse. Similarly, during the first period p11b, the driving signal applied to each of the first sensors TX2, TX3, and TX4 may include three first sign (+) of pulses and one second sign (−) of pulse. In this case, during the first period p11b, the offset signal may include a plurality of second sign (−) of pulses, and the number of plurality of second sign (−) of pulses may be the same as the number of pulses included in each of the driving signals during the first period p11b. For example, during the first period p11b, the offset signal applied to the second sensor RX1 may include four second sign (−) of pulses. Similarly, during the first period p11b, the offset signal applied to the second sensor RX2 may include four second sign (−) of pulses. Pulses of the offset signal and pulses of the driving signal may be synchronized. For example, the pulses of the offset signal and the pulses of the driving signal may be simultaneously generated and may simultaneously degenerated.

During the second sensing frame period TFR2b, the sensor receiver TSC may transmit the offset signals to the second sensors RX2 and RX3 different from the second sensors RX1 and RX2 transmitting the offset signal during the first sensing frame period TFR1b. Similarly, during another subsequent sensing frame period, the sensor receiver TSC may differently set the second sensor to which the offset signal is transmitted.

In the conventional art, during the first sensing frame period TFR1b, the sensor driver 220 may detect whether or not the touch occurs with respect to all coordinates of the sensing area SA. However, in the present embodiment, during the first sensing frame period TFR1b, the sensor driver 220 may not detect whether or not the touch occurs with respect to coordinates corresponding to the second sensors RX1 and RX2 to which the offset signal is transmitted. Similarly, in the conventional art6, during the second sensing frame period TFR2b, the sensor driver 220 may detect whether or not the touch occurs with respect to all coordinates of the sensing area SA. However, in the present embodiment, during the second sensing frame period TFR2b, the sensor driver 220 may not detect whether or not the touch occurs with respect to coordinates corresponding to the second sensors RX2 and RX3 to which the offset signal is transmitted. However, since coordinates which are not detected in a specific sensing frame period may be detected in other sensing frame periods, the sensors SC may detect all of the coordinates of the sensing area SA. For example, in a driving method in which 100 sensing frame periods are progressed to detect a single touch, since the touch is not detected twice with respect to the same position, the present embodiment may show accuracy of 98% compared to the conventional art.

Meanwhile, according to the present embodiment, EMI may be effectively reduced while maintaining an SNR without changing a frequency of the driving signal. Referring to a time point at which each of pulses is generated in FIG. 9, three first sign (+) of pulses, for example, one from TX1, one from TX2, and one from TX3, and one second sign (−) of pulses, for example, one from TX4, are generated when the first period p11b starts. In addition, one second sign (−) of pulses are generated in each of the second sensors RX1 and RX2 when the first period p11b starts. Because sum of the first sign (+) of pulses and sum of the second sign (−) of pulses are same, the EMI may be minimized to an extent that the EMI theoretically becomes 0. In addition, according to the present embodiment, since a separate electrode for EMI offset is unnecessary and the existing second sensors RX are used, there is an advantage in that an additional cost is not required.

Figure 11:
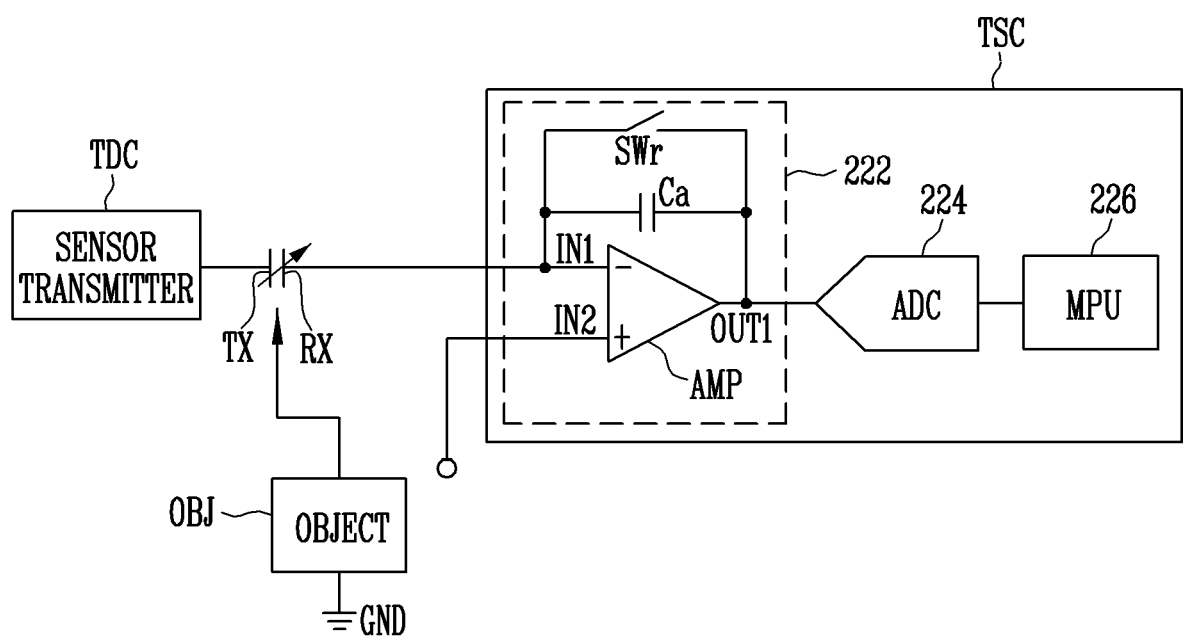
FIGS. 11, 12 and 13 are diagrams illustrating a method of driving a sensor device according to another embodiment of the disclosure.
Figure 12:
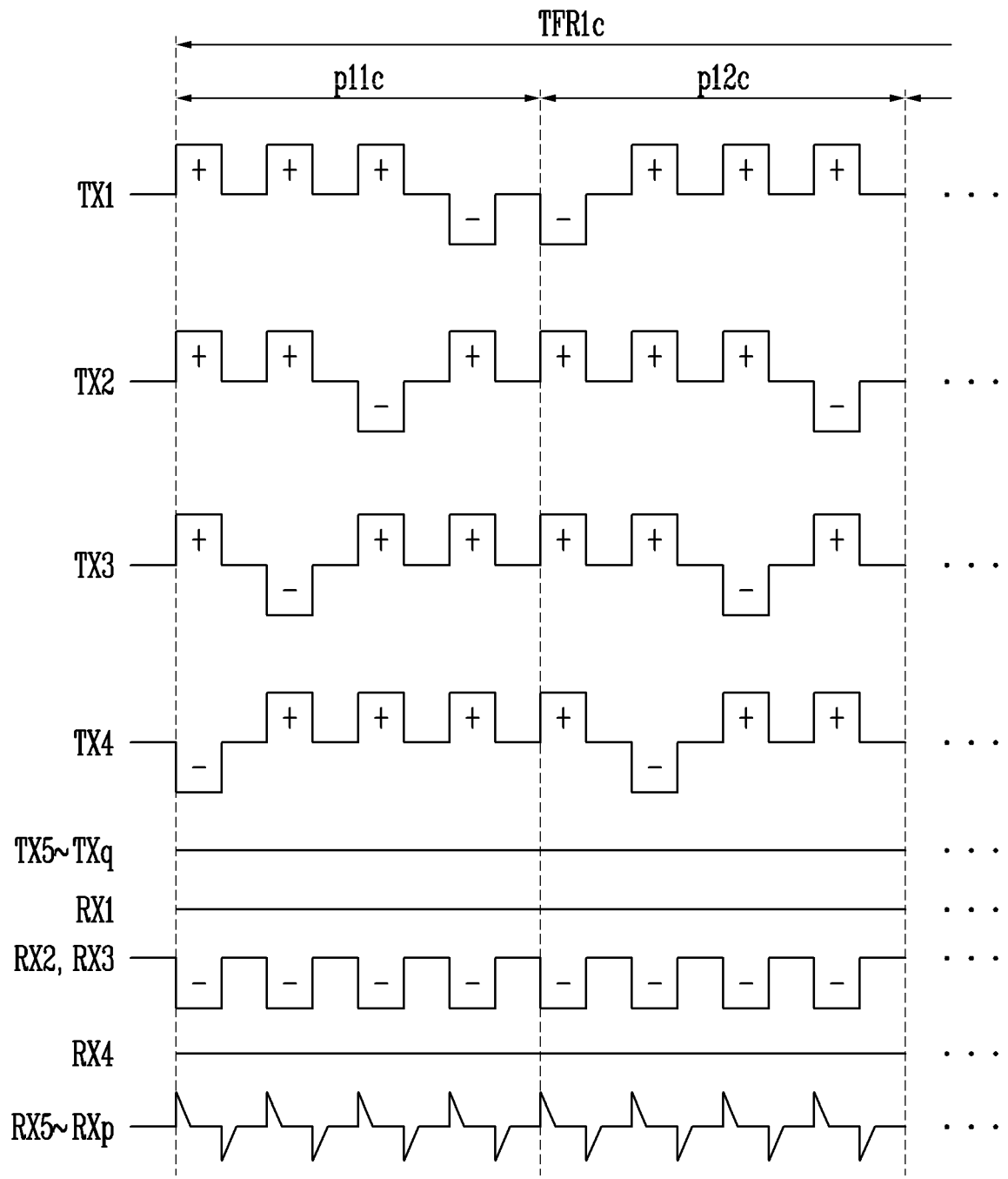
Figure 13:
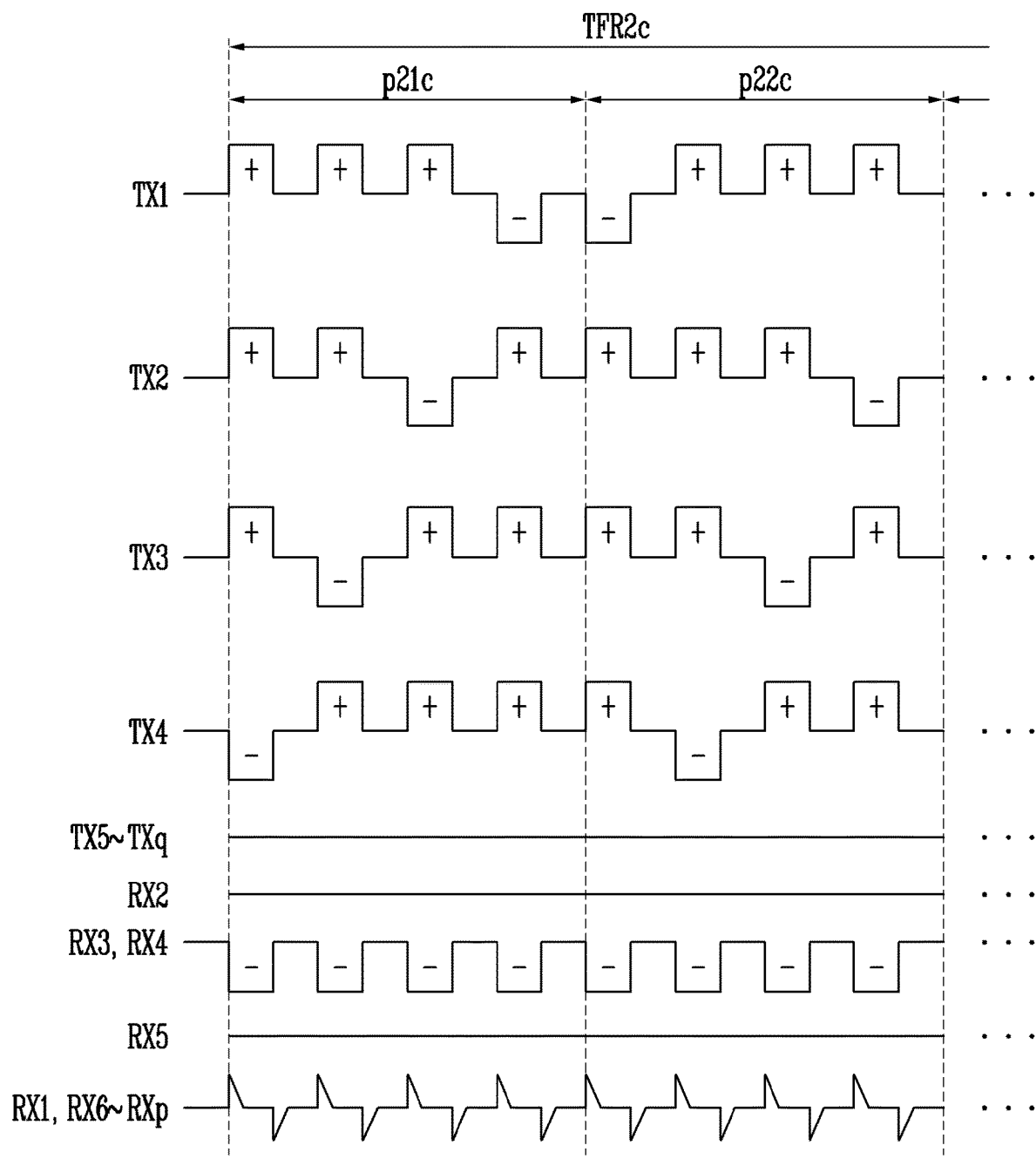

FIGS. 11 to 13 are diagrams illustrating a method of driving a sensor device according to another embodiment of the disclosure.

Referring to FIG. 11, the second input terminal IN2 of the amplifier AMP included in some of the sensor channels 222 may be floated. That is, since power is not connected to the second input terminal IN2, a voltage may not be defined.

Referring to FIG. 12, the sensor receiver TSC may float the second input terminal IN2 in the second sensors RX1 and RX4 most adjacent to the second sensors RX2 and RX3 to which the offset signal is transmitted during a first period p11c. To this end, as described above with reference to FIG. 11, the second input terminal IN2 of the amplifier AMP included in the sensor channel 222 corresponding to each of the second sensors RX1 and RX4 may be disconnected from any voltage source.

According to the present embodiment, the second sensors RX1 and RX4 may shield the offset signals from the second sensors RX2 and RX3 during the first period p11c, and thus interference to the sensing signals transmitted from the second sensors RX5 to RXp may be prevented.

In another embodiment, the sensor receiver TSC may supply the DC power GND to the second sensors RX1 and RX4 most adjacent to the second sensors RX2 and RX3 to which the offset signal is transmitted during the first period p11c. To this end, as described above with reference to FIG. 6, the DC power GND may be connected to the second input terminal IN2 of the amplifier AMP included in the sensor channel 222 corresponding to each of the second sensors RX1 and RX4. The second sensors RX1 and RX4 may function as a shielding electrode. However, the sensor receiver TSC is different from that of the embodiment of FIG. 9 in that a signal from the second sensors RX1 and RX4 is not used for calculating the touch position during the first period p11c.

Except for shielding against the offset signals, a first sensing frame period TFR1c and a second sensing frame period TFR2c of FIGS. 12 and 13 are substantially the same as the first sensing frame period TFR1b and the second sensing frame period TFR2b of FIGS. 9 and 10, and thus a repetitive description is omitted.

In the present embodiment, based on a driving method in which 100 sensing frame periods are performed to detect a single touch, the touch is not detected four times with respect to the same position, and thus accuracy of 96% may be shown compared to the conventional art. According to the present embodiment, based on the embodiment of FIGS. 9 and 10, a shielding effect by the offset signals additionally exists.

Figure 14:
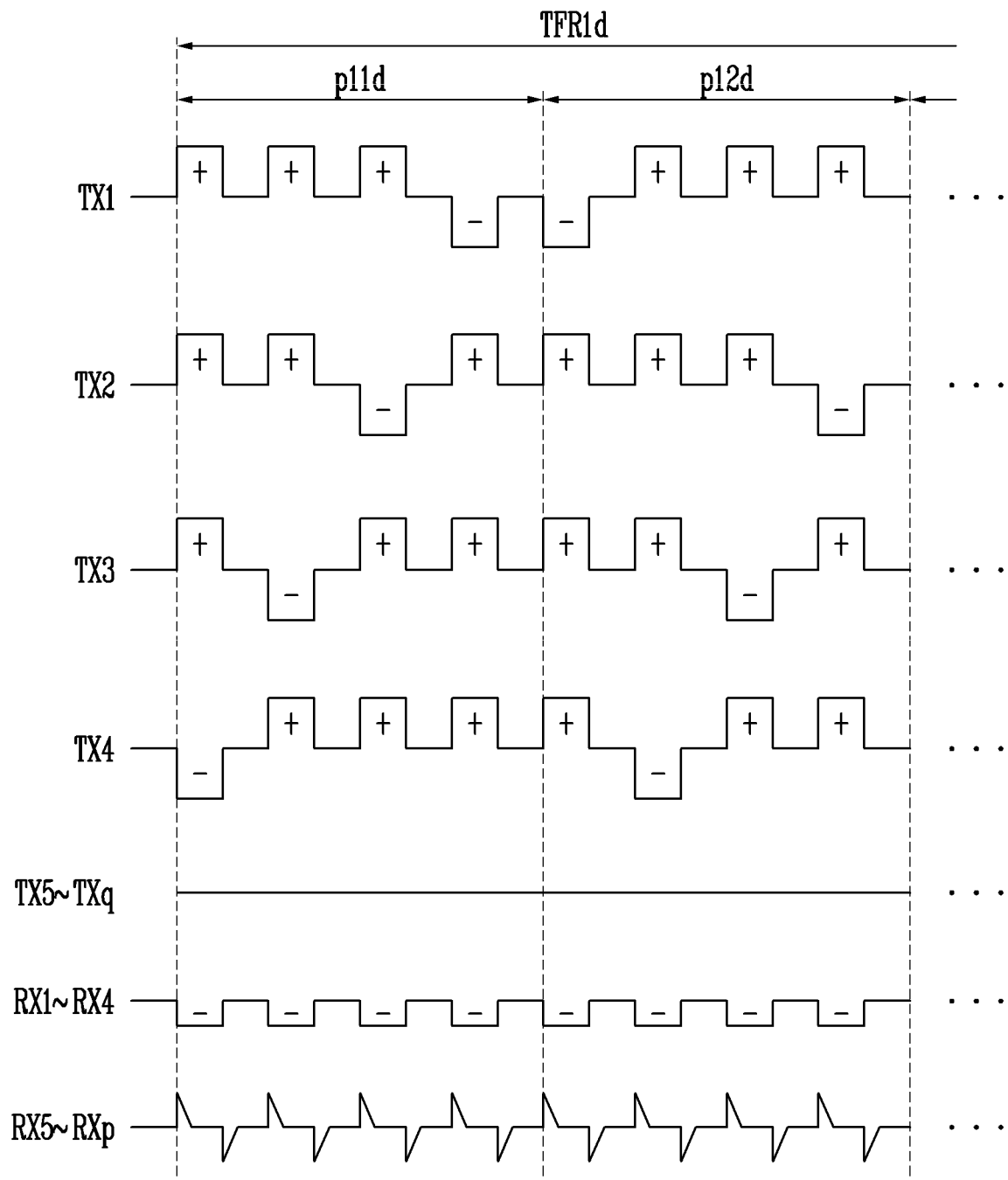
FIGS. 14 and 15 are diagrams illustrating a method of driving a sensor device according to still another embodiment of the disclosure.
Figure 15:
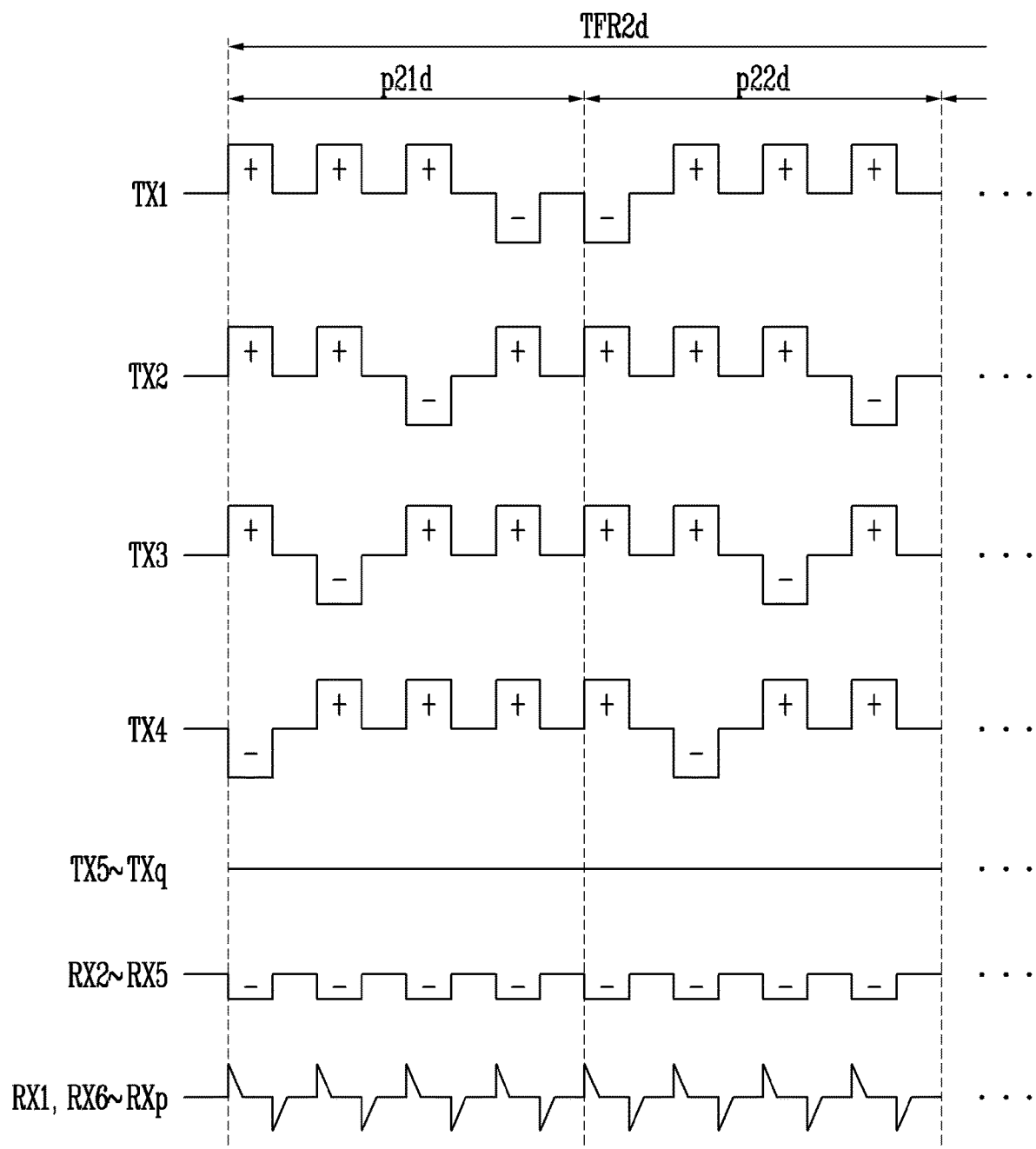

FIGS. 14 and 15 are diagrams illustrating a method of driving a sensor device according to still another embodiment of the disclosure.

In describing FIG. 9, it has been assumed that the voltage magnitudes (absolute values) of the pulses of the offset signal and the driving signals are the same.

However, referring to FIG. 14, the magnitudes of the absolute value of the pulses included in the offset signal may be less than the magnitudes of the absolute value of the pulses included in each of the driving signals. In this case, the sensor receiver TSC may minimize the EMI by transmitting the offset signal to more second sensors RX1 to RX4 during a first period p11d than during the first period p11b of FIG. 9. For example, it is assumed that the magnitudes of the absolute value of the pulses included in the offset signal are half of the magnitudes of the absolute value of the pulses included in each of the driving signals. In this case, the sensor receiver TSC may minimize the EMI by transmitting the offset signal to the four second sensors RX1 to RX4 during the first period p11d.

Except for the number of second sensors transmitting the offset signals, a first sensing frame period TFR1d and a second sensing frame period TFR2d of FIGS. 14 and 15 are substantially the same as the first sensing frame period TFR1b and the second sensing frame period TFR2b of FIGS. 9 and 10, a repetitive description is omitted.

The drawings referred to so far and the detailed description of the disclosure described herein are merely examples of the disclosure, are used for merely describing the disclosure, and are not intended to limit the meaning and the scope of the disclosure described in claims. Therefore, those skilled in the art will understand that various modifications and equivalent other embodiments are possible from these. Thus, the true scope of the disclosure should be determined by the technical spirit of the appended claims.

What is claimed is:

1. A sensor device comprising:
   first sensors;
   second sensors forming a capacitance with the first sensors; and
   a sensor driver configured to transmit driving signals to the first sensors and receive sensing signals from the second sensors,
   wherein the sensor driver simultaneously transmits driving signals to at least two first sensors during a first period and does not transmit driving signals to the rest of the first sensors during the first period,
   wherein the sensor driver transmits an offset signal to at least one of the second sensors during the first period and receives the sensing signals from at least two of the second sensors other than the at least one of the second sensors during the first period,
   wherein each of the driving signals includes at least one first sign of pulse and at least one second sign of pulse,
   wherein the offset signal includes a plurality of second sign of pulses during the first period,
   wherein a number of the plurality of second sign of pulses included in the offset signal is the same as a number of pulses included in each of the driving signals during the first period, and
   wherein a number of the at least one first sign of pulse included in each of the driving signals is greater than a number of the at least one second sign of pulse included in each of the driving signals during the first period.

2. The sensor device according to claim 1, wherein a first sensing frame period includes the first period and a second period subsequent to the first period, and
   wherein the sensor driver transmits the driving signals to the at least two first sensors during the first period and the second period, and a waveform of the driving signals transmitted during the first period and a waveform of the driving signals transmitted during the second period are different from each other.

3. The sensor device according to claim 1, wherein each of the driving signals includes the same number of pulses during the first period, and
   wherein a ratio of the at least one first sign of pulse to the at least one second sign of pulse in the each of the driving signals is same.

4. The sensor device according to claim 3, wherein a first sensing frame period includes the first period, and
   wherein the sensor driver transmits the driving signals of a same waveform as the first period of the first sensing frame period to same first sensors during a first period of a second sensing frame period subsequent to the first sensing frame period.

5. The sensor device according to claim 4, wherein, during the second sensing frame period, the sensor driver transmits the offset signal to a second sensor different from a second sensor to which the sensor driver transmits the offset signal during the first sensing frame period.

6. The sensor device according to claim 1, wherein the sensor driver includes a plurality of sensor channels each of which includes an amplifier, the amplifier including:
a first input terminal connected to a corresponding second sensor, and
a second input terminal connected to a DC power source or a power source other than the DC power source.

7. The sensor device according to claim 1, wherein the sensor driver transmits the offset signal to the at least one of the second sensors during the first period and receives the sensing signals from the rest of the second sensors other than the at least one of the second sensors during the first period.

8. The sensor device according to claim 1, wherein a second sensor disposed adjacent to a second sensor to which the offset signal is transmitted is floated during the first period.

9. The sensor device according to claim 1, wherein a magnitude of absolute value of each pulses included in the offset signal is less than a magnitude of absolute value of each pulses included in each of the driving signals.

10. A method of driving a sensor device including first sensors and second sensors forming a capacitance with the first sensors, the method comprising:
simultaneously transmitting driving signals to at least two first sensors during a first period and not transmitting driving signals to the rest of the first sensors during the first period;
transmitting an offset signal to at least one of the second sensors during the first period; and
receiving sensing signals from at least two of the second sensors other than the at least one of the second sensors during the first period,
wherein each of the driving signals includes at least one first sign of pulse and at least one second sign of pulse,
wherein the offset signal includes a plurality of second sign of pulses during the first period,
wherein a number of the plurality of second sign of pulses included in the offset signal is the same as a number of pulses included in each of the driving signals during the first period, and
wherein a number of the at least one first sign of pulse included in each of the driving signals is greater than a number of the at least one second sign of pulse included in each of the driving signal during the first period.

11. The method according to claim 10, wherein a first sensing frame period includes the first period and a second period subsequent to the first period,
wherein the driving signals are transmitted to same first sensors during the first period and the second period, and
wherein a waveform of the driving signals transmitted in the first period and a waveform of the driving signals transmitted in the second period are different from each other.

12. The method according to claim 10, wherein each of the driving signals includes the same number of pulses during the first period, and
wherein a ratio of the at least one first sign of pulse to the at least one second sign of pulse in the each of the driving signals is same.

13. The method according to claim 12, wherein a first sensing frame period includes the first period, and
wherein the driving signals of a same waveform as the first period of the first sensing frame period are transmitted to same first sensors during a first period of a second sensing frame period subsequent to the first sensing frame period.

14. The method according to claim 13, wherein, during the second sensing frame period, the offset signal is transmitted to a second sensor different from a second sensor to which the sensor driver transmits the offset signal during the first sensing frame period.

15. The method according to claim 10, wherein the sensor driver includes a plurality of sensor channels each of which includes an amplifier, the amplifier including:
a first input terminal connected to a corresponding second sensor, and
a second input terminal connected to DC power source or a power source other than the DC power source.

16. The method according to claim 10, wherein the offset signal is transmitted to the at least one of the second sensors during the first period, and the sensing signals is received from all of the rest of the second sensors during the first period.

17. The method according to claim 10, wherein a second sensor disposed adjacent to the second sensor to which the offset signal is transmitted is floated during the first period.

18. The method according to claim 10, wherein a magnitude of absolute value of each pulses included in the offset signal is less than a magnitude of absolute value of each pulses included in each of the driving signals.

* * * * *